United States Patent
Nagaya

(10) Patent No.: US 10,668,779 B2
(45) Date of Patent: Jun. 2, 2020

(54) FUNCTIONAL COMPONENT ATTACHING MEMBER

(71) Applicant: BRIDGESTONE CORPORATION, Tokyo (JP)

(72) Inventor: Go Nagaya, Tokyo (JP)

(73) Assignee: BRIDGESTONE CORPORATION, Chuo-ku, Tokyo (JP)

(*) Notice: Subject to any disclaimer, the term of this patent is extended or adjusted under 35 U.S.C. 154(b) by 0 days.

(21) Appl. No.: 16/078,301

(22) PCT Filed: Feb. 24, 2017

(86) PCT No.: PCT/JP2017/007240
§ 371 (c)(1),
(2) Date: Aug. 21, 2018

(87) PCT Pub. No.: WO2017/150396
PCT Pub. Date: Sep. 8, 2017

(65) Prior Publication Data
US 2019/0047336 A1    Feb. 14, 2019

(30) Foreign Application Priority Data

Mar. 2, 2016 (JP) .................................. 2016-040293

(51) Int. Cl.
*F16M 11/00* (2006.01)
*B60C 23/04* (2006.01)
(Continued)

(52) U.S. Cl.
CPC .......... *B60C 23/0493* (2013.01); *B60C 19/00* (2013.01); *B60C 23/04* (2013.01); *F16M 13/02* (2013.01)

(58) Field of Classification Search
CPC .............. B60C 19/001; B60C 23/0493; B60C 23/0491; B29D 2030/0072
See application file for complete search history.

(56) References Cited

U.S. PATENT DOCUMENTS 3,958,840 A * 5/1976 Hickox .................... F02K 9/84
                                                          384/129
6,546,982 B1 * 4/2003 Brown .................... B60C 23/04
                                                          152/152.1
(Continued)

FOREIGN PATENT DOCUMENTS

CN    101326065 A    12/2008
CN    103129330 A     6/2013
(Continued)

OTHER PUBLICATIONS

International Preliminary Report on Patentability and Translation of Written Opinion, dated Sep. 13, 2018 from the International Bureau in counterpart International application No. PCT/JP2017/007240.
(Continued)

*Primary Examiner* — Amy J. Sterling
(74) *Attorney, Agent, or Firm* — Sughrue Mion, PLLC

(57) ABSTRACT

In order to provide a functional component attaching member of which durability can be further improved because when a load is applied to a functional component while a vehicle is travelling, the load can also be borne by portions other than a wall portion opposite to a load direction, the present invention provides a rubber functional component attaching member (functional component mounting base 1) for fastening a functional component 29 to an inner surface 70 of a tire, comprising a bottom surface 4 that is fixed to the inner surface 70 of the tire, an attaching portion 2 having a recessed portion 2A to which a functional component-side attaching portion 30 provided to the functional component 29 is attached, and a reinforcing material 20 embedded in a rubber portion on an outer side of the recessed portion 2A.

16 Claims, 10 Drawing Sheets

(51) Int. Cl.
  *B60C 19/00*    (2006.01)
  *F16M 13/02*    (2006.01)

(56) References Cited

U.S. PATENT DOCUMENTS

| | | | |
|---|---|---|---|
| 7,881,066 B2 * | 2/2011 | Scheungraber | B60C 23/0493 361/749 |
| 9,566,835 B2 * | 2/2017 | Yamaguchi | B60C 23/0493 |
| 2006/0220816 A1 | 10/2006 | Scheungraber et al. | |
| 2009/0173422 A1 | 7/2009 | Utsumi et al. | |
| 2010/0276563 A1 | 11/2010 | Cubizolle et al. | |
| 2013/0133800 A1 | 5/2013 | Griffoin | |
| 2017/0066294 A1 * | 3/2017 | Nagaya | B60C 23/0493 |
| 2017/0166016 A1 | 6/2017 | Sakamoto et al. | |

FOREIGN PATENT DOCUMENTS

| | | |
|---|---|---|
| DE | 102007003189 A1 | 7/2008 |
| EP | 0 694 861 A2 | 1/1996 |
| EP | 1970222 A1 | 9/2008 |
| EP | 2845751 A1 | 3/2015 |
| JP | 2002-211222 A | 7/2002 |
| JP | 2006-258733 A | 9/2006 |
| JP | 2007-062405 A | 3/2007 |
| JP | 2007-176479 A | 7/2007 |
| JP | 2011-500442 A | 1/2011 |
| JP | 2015-160512 A | 9/2015 |
| JP | 2016-022868 A | 2/2016 |
| WO | 2007/077785 A1 | 7/2007 |
| WO | 2008/143326 A1 | 11/2008 |
| WO | 2015/129453 A1 | 9/2015 |

OTHER PUBLICATIONS

International Search Report of PCT/JP2017/007240 dated May 30, 2017 [PCT/ISA/210].

Communication dated Dec. 18, 2018 from the European Patent Office in application No. 17759862.0.

Communication dated Oct. 31, 2019, from the State Intellectual Property Office of the P.R.C in application No. 2017800146715.

* cited by examiner

TIRE ROTATION DIRECTION

TIRE ROTATION DIRECTION

FUNCTIONAL COMPONENT ATTACHING MEMBER

CROSS REFERENCE TO RELATED APPLICATIONS

This application is a National Stage of International Application No. PCT/JP2017/007240, filed Feb. 24, 2017, claiming priority based on Japanese Patent Application No. 2016-040293, filed Mar. 2, 2016.

BACKGROUND OF THE INVENTION

1. Field of the Invention

The present invention relates to a functional component attaching member for attaching a functional component to an inner surface of a tire.

2. Description of the Related Art

For example, it is known that the state of a tire is detected by a functional component such as a sensor module, which integrally includes sensors (a pressure sensor, a temperature sensor, an acceleration sensor, etc.), a battery or a power generation element and a radio, and which is attached to an inner surface of the tire via a functional component mounting base as a rubber-made functional component attaching member (Patent Documents 1 and 2).

The vehicle tires rotate while the lowermost parts of peripheral surfaces of tires are contacted with ground while a vehicle is travelling, non-ground contact parts perform rotational movement, and ground contact parts perform linear movement. Therefore, at a step-in edge (FIG. 19) which is a boundary at which a part of the peripheral surface of a tire 60 shifts from the non-ground contact part to the ground contact part and a kick-out edge which is a boundary at which a part of the peripheral surface of the tire 60 shifts from the ground contact part to the non-ground contact part, centripetal forces F1 and F1 produced by rotations of the tire 60 are unbalanced, and an inertial force F2 is applied to a functional component 290 attached to an inner surface 70 of the tire 60 via a functional component mounting base 100 (see FIG. 19). This inertial force F2 increases as the rotation speed of the tire 60 (vehicle speed) is increased, and sometimes it reaches several tens of kgf. Therefore, there is a possibility that the functional component mounting base 100 to which the functional component 290 is attached is broken, and the functional component 290 attached to the functional component mounting base 100 drops off. In the figure, R denotes a rotation direction (rolling direction) of the tire 60.

As shown in FIG. 20, the functional component mounting base 100 formed of rubber and having an attaching portion 200 with a recessed portion 200A in which a functional component-side attaching portion 300 of the functional component 290 is attached in a fitted state is known that it is provided with projection portions 201 and a recessed portion 202 which are provided on the inner bottom portion of the recessed portion 200A and mechanically fitted with recessed portions 301 and a projection portion 302 which are provided on the bottom of the functional component-side attaching portion 300 (see Patent Document 2).

According to the functional component attachment base 100, when a load (inertial force) is applied to the functional component 290 as indicated by white arrows while a vehicle is travelling as shown in FIG. 20 and FIG. 21, the load is received not only by the wall portion of the functional component mounting base 100 but also by the projection portions 201 of the inner bottom surface of the recessed portion 200A, so that the load concentration on the wall portion of the functional component mounting base 100 can be moderated. Namely, the load (inertial force) applied to the functional component 290 can be distributed to the projection portions 201 formed on the inner bottom portion of the recessed portion 200A of the functional component mounting base 100, and the functional component mounting base 100 improved in durability can be obtained.

CONVENTIONAL ART DOCUMENT

Patent Document

Patent Document 1: Japanese Unexamined Patent Application Publication (Translation of PCT Application) No. 2011-500442

Patent Document 2: Japanese Unexamined Patent Application Publication No. 2015-160512

SUMMARY OF THE INVENTION

Problem to be Solved by the Invention

However, according to a functional component mounting base (functional component attaching member) of Patent Document 2, when a load is applied to a functional component while a vehicle is travelling, the load is applied intensively to the wall portion which is opposite to the load direction in the outer circumferential wall portion of the functional component mounting base 100 as shown in FIG. 21, and no load is applied to portions other than the wall portion opposite to the load direction.

The present invention provides a functional component attaching member that when a load is applied to a functional component while a vehicle is travelling, can bear the load not only by a wall portion opposite to a load direction but also by portions other than the wall portion opposite to the load direction and that can further improve the durability.

Means for Solving the Problem

The functional component attaching member according to the present invention is a functional component attaching member which is formed of rubber for attaching a functional component to an inner surface of a tire, including a bottom surface to be fixed to the inner surface of the tire, an attaching portion having a recessed portion in which a functional component-side attaching portion provided on the functional component is fitted in a fitted state; and a reinforcing material embedded in a rubber portion on an outer side of the recessed portion. Accordingly, when a load is applied to the functional component while a vehicle is travelling, the load can also be borne by portions other than the wall portion opposite to a load direction, and durability can be further improved.

The invention will now be described in detail based on embodiments which do not intend to limit the scope of the claims of the present invention but exemplify the invention. All of the features and the combinations thereof described in the embodiments are not necessarily essential to the invention, and constructions and arrangements to be employed selectively are included in the invention.

MODE FOR CARRYING OUT THE INVENTION

Embodiment 1

Figure 1:
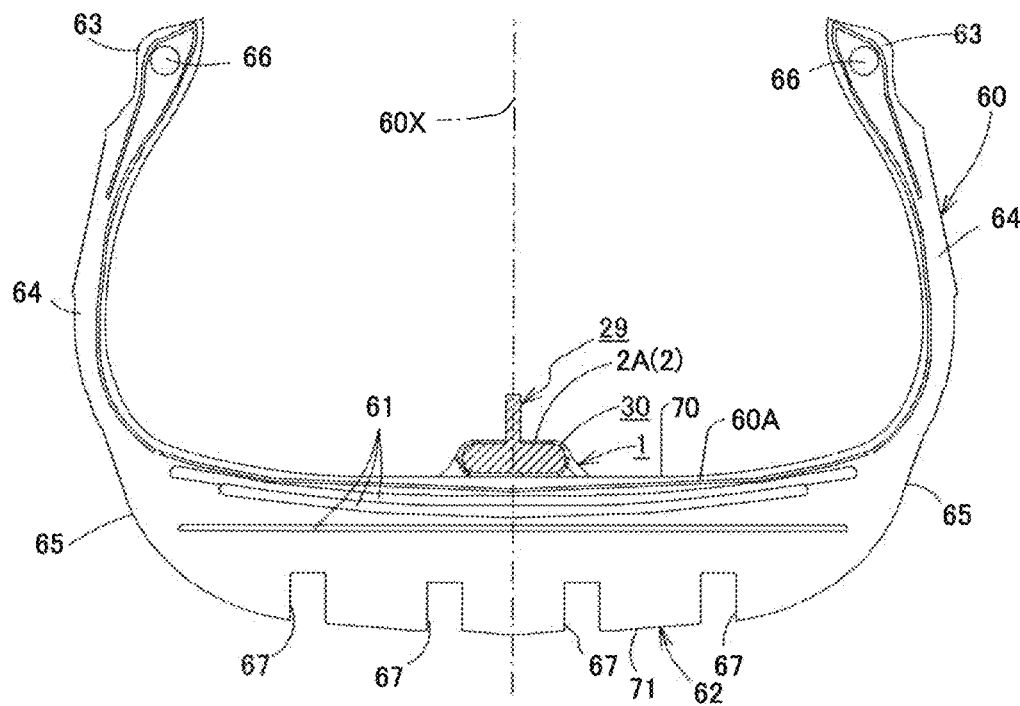
FIG. 1 is a sectional view of a tire showing a state of a functional component attached to an inner surface of the tire via a functional component mounting base (Embodiment 1).
Figure 2:
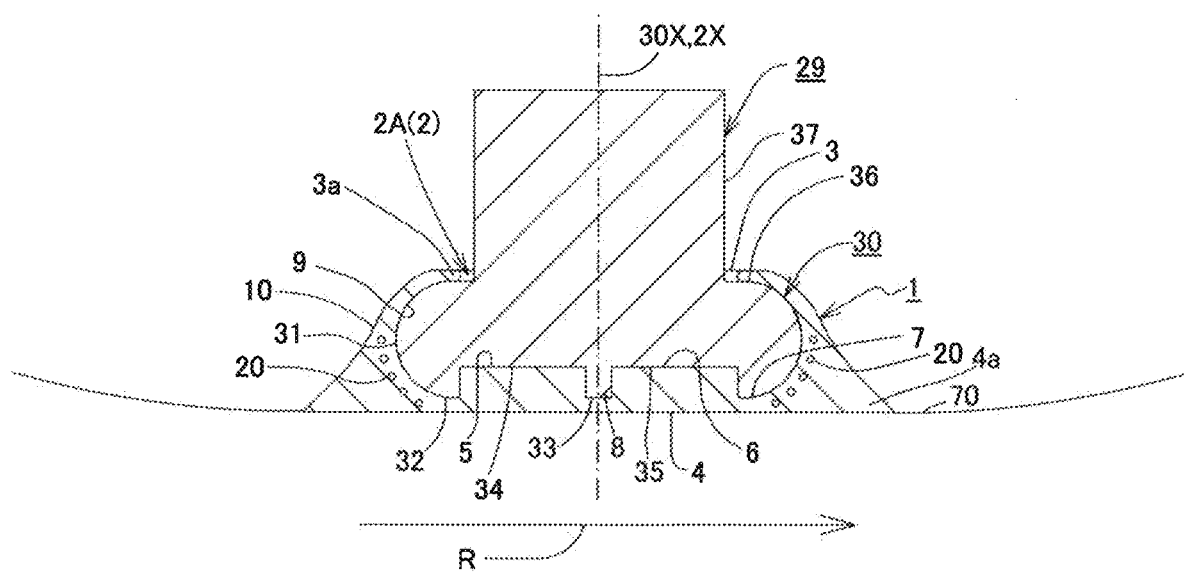
FIG. 2 is a sectional view of the functional component mounting base attached to the inner surface of the tire and the functional component attached to the functional component mounting base (Embodiment 1).

As shown in FIG. 1 and FIG. 2, a functional component mounting base 1 as a rubber-made functional component attaching member for attaching a functional component 29 to an inner surface 70 of a tire 60 according to Embodiment 1 is provided with an attaching portion 2 having a recessed portion 2A in which a functional component-side attaching portion 30 provided to the functional component 29 is housed and attached in a fitted state, a bottom surface (outer bottom surface) 4 as a fixing portion to be fixed to the inner surface 70 of the tire 60, and a reinforcing material 20 which distributes a load received from the functional component-side attaching portion 30 which is fitted in a fitted state to the recessed portion 2A of the attaching portion 2 in a state fixed to the inner surface 70 of the tire 60, wherein portions other than the reinforcing material 20 are formed of rubber (elastic rubber).

For example, the functional component 29 is configured by mounting detection means (not shown) to detect a state of the tire 60, and specifically it is a sensor module integrally formed by hardening with resin the circumferences of components such as sensors (a pressure sensor, a temperature sensor, acceleration sensor, etc.) as detection means, a battery or a power generation element, a radio, etc. which are not shown but mounted to a mounting substrate.

The functional component 29 is provided with the functional component-side attaching portion 30 made of a resin and a protrusion part 37 which is formed to protrude from the functional component-side attaching portion 30, and the above-described components such as sensors etc. which are built into at least one of the functional component-side attaching portion 30 and the protrusion part 37 so as to have a function for measuring for example a temperature, a pressure, etc. within the tire 60.

The tire 60 includes a carcass 60A, belts 61, a tread region 62, bead regions 63, side wall regions 64, and shoulder regions 65. The carcass 60A is arranged to have a plurality of cord layers, which are laminated from the inner surface 70 side of the tire 60 toward an outer surface 71 side of the tire 60, are toroidally extended between a pair of bead regions 63, 63. For example, a plurality of layers on the inner layer side form a turned-up ply with their both ends folded back from the inside in the tire width direction to the outside with respect to a bead core 66 in the bead region 63, and a plurality of layers on the outer layer side form a down ply with their both ends folded back from the outside in the tire width direction to the inside with respect to the bead core 66 in the bead region 63. The belts 61 are provided between the carcass 60A and the tread region 62. The tread region 62 is arranged outside in the tire radial direction of the carcass 60A and the belts 61. The surface of the tread region 62 is formed with a plurality of main circumferential grooves 67 extending in the tire peripheral direction.

Figure 3:
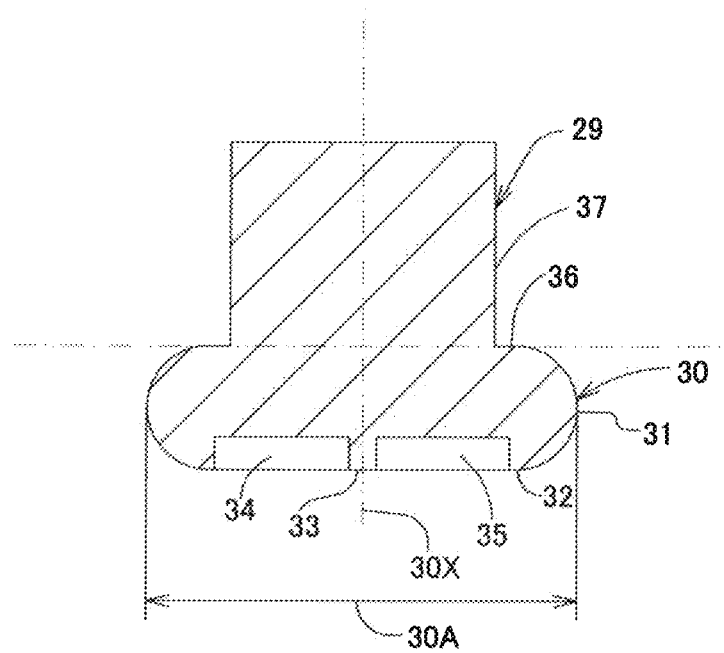
FIG. 3 is a sectional view showing the functional component (Embodiment 1).
Figure 5:
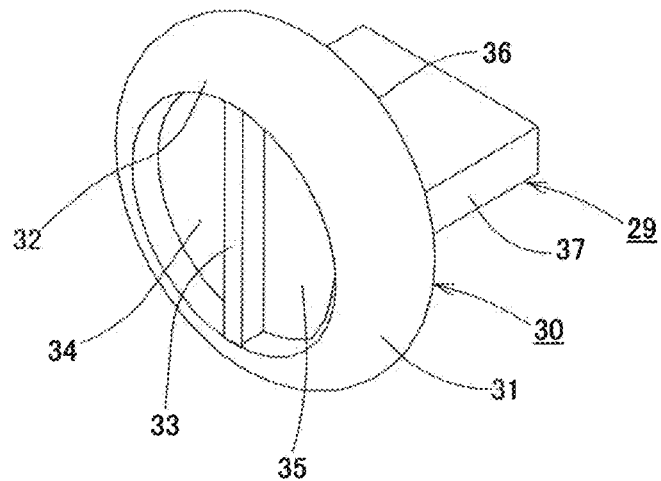
FIG. 5 is a perspective view of a functional component-side attaching portion viewed from a bottom surface side (Embodiment 1).

Referring to FIG. 2, FIG. 3 and FIG. 5, the functional component-side attaching portion 30 provided on the functional component 29 is explained below.

The functional component-side attaching portion 30 is formed into a shape to be fitted into the recessed portion 2A of the attaching portion 2 in the functional component mounting base 1, for example, the shape of a rotating body which is obtained with the short axis of a rounded rectangle as a rotation axis (a central axis 30X of the functional component-side attaching portion 30).

The functional component-side attaching portion 30 is provided with a bottom which contacts the inner bottom surface of the recessed portion 2A when fitted to the recessed portion 2A of the attaching portion 2, a top portion which is opposite to the bottom, and a side portion (outer peripheral surface) which connects the bottom and the top portion.

The side portion of the functional component-side attaching portion 30 is formed to have an arc surface 31 which curves to protrude in a direction away from the central axis 30X along the central axis 30X of the functional component-side attaching portion 30. In other words, the side portion of the functional component-side attaching portion 30 has a cross sectional shape arc surface 31 that curves to protrude in the direction away from the central axis 30X along the central axis 30X of the functional component-side attaching portion 30.

The bottom of the functional component-side attaching portion 30 includes an annular surface 32 having the central axis 30X of the functional component-side attaching portion 30 as the center, a partition projection 33 which is provided to divide a circular recessed portion, which has as the center the central axis 30X and disposed inside the annular surface 32, into two from its bottom surface, and two semicircular recessed portions 34 and 35 which are formed by being divided by the partition projection 33 (see FIG. 5).

A top portion of the functional component-side attaching portion 30 has a ring-shaped flat surface 36, which has as the center the central axis 30X, covered by an opening edge 3a of the opening 3 of the recessed portion 2A of the attaching portion 2. And, a protrusion part 37 is disposed to extend from the flat surface 36 in a direction opposite from the bottom. The protrusion part 37 is used as a portion in which the components such as the above-described sensors are to be built in, and used as a handle when attaching the functional component-side attaching portion 30 into the recessed portion 2A of the attaching portion 2.

In other words, as shown in FIG. 3, the functional component-side attaching portion 30 is formed to have a diameter size (an outer diameter size of the functional component-side attaching portion 30 which is a length in a direction orthogonal to the central axis 30X having the central axis 30X as the center) at the center portion (the center portion of the side surface (arc surface 31)) in a direction along the central axis 30X that is a maximum diameter 30A larger than the diameter sizes at both end portions (the bottom and the top portion) in the direction along the central axis 30X.

Figure 4:
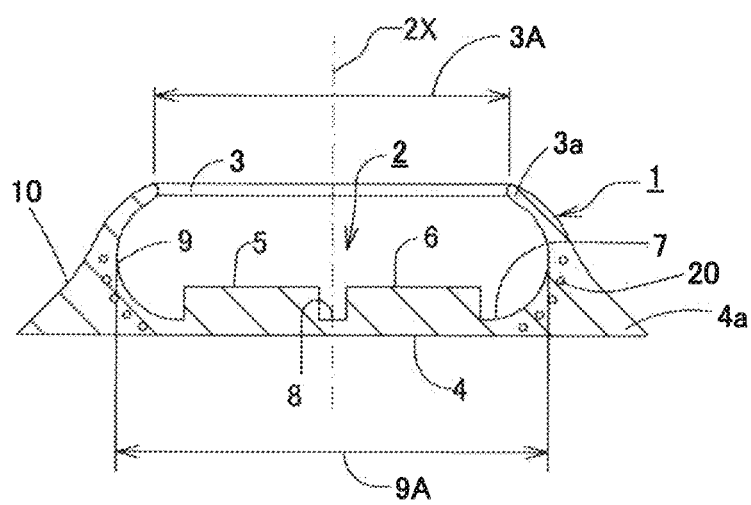
FIG. 4 is a sectional view showing the functional component mounting base (Embodiment 1).

Next, the functional component mounting base 1 is described with reference to FIG. 2, FIG. 4 and FIG. 6.

The attaching portion 2 in the functional component mounting base 1 is configured to have a recessed portion 2A corresponding to the shape of the functional component-side attaching portion 30, so that the functional component-side attaching portion 30 inserted into the recessed portion 2A has a state that it is fitted into the recessed portion 2A by rubber elasticity of the functional component mounting base 1.

The recessed portion 2A into which the functional component-side attaching portion 30 is fitted includes an opening 3 which becomes an inlet/outlet for inserting/removing the functional component-side attaching portion 30 into/from the recessed portion 2A, an inner bottom portion which is opposite to the opening 3, and an inner wall surface 9 for connecting the opening 3 and the inner bottom portion.

The recessed portion 2A is formed to have a diameter 3A of the opening 3 with a size smaller than the maximum diameter 30A of the functional component-side attaching portion 30 and the inner surfaces (the inner bottom surface and the inner wall surface 9) formed into a fitting surface which is fitted with the outer surfaces (the bottom, the side portion and the top portion) of the functional component-side attaching portion 30.

That is, the recessed portion 2A is formed into a recessed portion having the shape of the functional component-side attaching portion 30, for example, the shape of a rotating body which is obtained with the short axis of a rounded rectangle as a rotation axis (the central axis 2X of the recessed portion 2A).

The inner wall surface 9 of the recessed portion 2A is formed to have a maximum diameter 9A that a diameter size (the inner diameter size of the recessed portion 2A which is a length in a direction orthogonal to the central axis 2X having the central axis 2X as the center) of the center portion in a direction along the central axis 2X of the recessed portion 2A is a size larger than the diameter 3A of the opening 3 of the recessed portion 2A and the diameter of the inner bottom portion of the recessed portion 2A. That is, the recessed portion 2A is formed so that the opening 3 which becomes an inlet/outlet for inserting/removing the functional component-side attaching portion 30 has the diameter 3A which is smaller than the maximum diameter 30A of the functional component-side attaching portion 30 and the maximum diameter 9A of the recessed portion 2A corresponding to the maximum diameter 30A. In other words, it is configured that the diameter of the opening 3 is expanded to cover, with rubber on the opening edge 3a side, the top portion of the functional component-side attaching portion 30 inserted into the recessed portion 2A and the top portion side of the side portion, and the functional component-side attaching portion 30 inserted into the recessed portion 2A is held in the fitted state by being pressed toward the inner bottom portion side of the recessed portion 2A by the elastic force of rubber of the functional component mounting base 1.

And, the inner bottom portion of the recessed portion 2A is formed to have raised and recessed portions which fit the surfaces of recessed and raised portions (the two semicircular recessed portions 34 and 35, the annular surface (projection portion) 32, and the partition projection (projection portion) 33) formed on the bottom of the functional component-side attaching portion 30.

Figure 6:
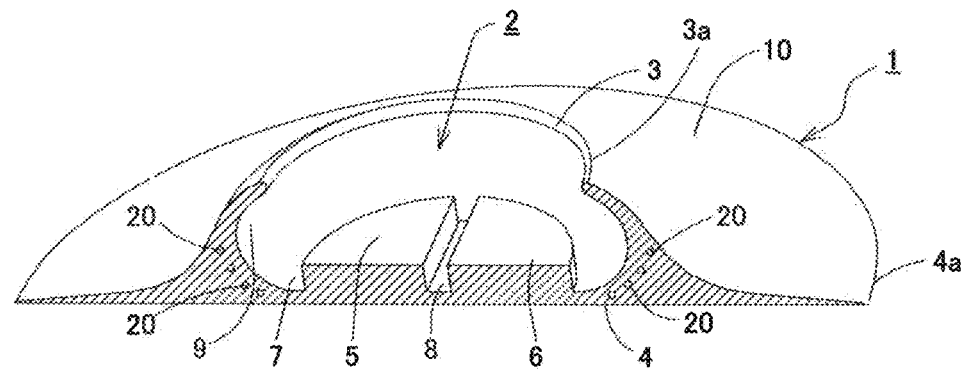
FIG. 6 is a perspective view showing a functional component mounting base (partial section) (Embodiment 1).

That is, as shown in FIG. 6, the inner bottom portion of the recessed portion 2A is configured of two semicircular projection portions 5 and 6 which fit the two semicircular recessed portions 34 and 35 formed on the bottom surface of the functional component-side attaching portion 30, an annular recessed portion 7 to which the annular surface 32 and the bottom of the side surface (arc surface 31) continued to the annular surface 32 are fitted, and a partitioning recessed portion 8 which partitions the two semicircular projection portions 5 and 6 when the partition projection 33 is fitted.

The bottom surface 4 of the functional component mounting base 1 functions as a fixing portion which is fixed to the inner surface 70 of the tire 60 via an adhesive. The bottom surface 4 is formed to have, for example, a circular surface with the central axis 2X of the recessed portion 2A as the center, and this circular surface is formed to have a diameter larger than the maximum diameter 9A of the recessed portion 2A. This bottom surface 4 is formed into a plane surface orthogonal to the central axis 2X of the recessed portion 2A.

And, an outer wall surface 10 of the functional component mounting base 1 is formed on a slope surface connecting the opening edge 3a of the opening 3 and an outer circumferential edge 4a of the bottom surface 4. This slope surface is configured to form the opening edge 3a side of the opening 3 and the outer circumferential edge 4a side of the bottom surface 4 on a gentle slope, and the center portion in the direction along the central axis 2X becomes a steep slope, so that a thickness of rubber at the opening edge 3a side of the opening 3 and the outer circumferential edge 4a side of the bottom surface 4 is reduced. Thus, it is configured that the rubber thickness at the opening edge 3a side of the opening 3 is reduced, so that work for expanding the diameter of the opening 3 is facilitated when the functional component-side attaching portion 30 is fitted into the recessed portion 2A. Since it is configured that the rubber thickness at the outer circumferential edge 4a side of the bottom surface 4 is reduced, adhesion between the outer circumferential edge 4a side and the inner surface 70 of the tire 60 is enhanced, and separation from the outer circumferential edge 4a is suppressed.

As shown in FIG. 2, the reinforcing material 20 is embedded in the rubber portion forming the functional component mounting base 1.

The reinforcing material 20 used is at least one spiral body or an annular ring body as at least one annular body each of which is independently made of, for example, a steel cord plated with brass or a linear material such as an organic fiber. And, it is configured that the spiral body or the annular ring body is embedded in the rubber portion on the outer side of the inner wall surface 9 of the recessed portion 2A to surround the periphery of the inner wall surface (inner peripheral surface) 9 of the recessed portion 2A of the functional component mounting base 1, so that the spiral body or the annular ring body functions as the reinforcing material 20 for distributing the load received from the functional component-side attaching portion 30 fitted to the attaching portion 2 which is fixed to the inner surface 70 of the tire 60.

As shown in FIG. 2, the reinforcing material 20 is specifically configured to have a plurality of annular bodies or at least one spiral body arranged along the inner wall surface 9 of the recessed portion 2A and embedded in the rubber portion on the outer side of the inner wall surface 9 of the recessed portion 2A so as to surround the periphery of the inner wall surface 9 of the recessed portion 2A. That is, the reinforcing material 20 is arranged within the rubber so as to have an equal distance between the reinforcing material 20 arranged in a direction along the central axis 2X of the recessed portion 20A and the inner wall surface 9 of the recessed portion 2A.

For example, the reinforcing material 20 is embedded in the rubber forming the functional component mounting base 1 by directly adhering to the rubber of the functional component mounting base 1 via an adhesive or adhering to the rubber of the functional component mounting base 1 via an adhesive rubber.

If the reinforcing material 20 has excessively high bending rigidity, rigidity of the functional component mounting base 1 increases excessively, the functional component mounting base 1 cannot follow deformation of the tire 60, and durability of the functional component mounting base 1 deteriorates. Therefore, it is desirable that the reinforcing material 20 has a twisted structure made of a fine filament.

The reinforcing material 20 is arranged to position at the bottom surface 4 side away from the position of the maximum diameter 9A of the recessed portion 2A which is provided between the opening 3 of the recessed portion 2A and the inner bottom portion of the recessed portion 2A. This configuration does not reinforce the opening edge 3a side of the opening 3 by the reinforcing material 20 and makes it easy to perform work of fitting into the recessed portion 2A of the functional component-side attaching portion 30 because it is easy to expand the diameter size of the opening 3 by pulling the opening edge 3a side of the opening 3 in a direction away from the central axis 2X, so that the diameter size of the opening 3 has a size larger than the maximum diameter 30A of the functional component-side attaching portion 30.

To fit the functional component-side attaching portion 30 to the recessed portion 2A, the opening 3 of the functional component mounting base 1 is expanded to insert the functional component-side attaching portion 30 into the recessed portion 2A of the attaching portion 2, and the recessed and raised portions (two semicircular recessed portions 34 and 35, the annular surface (projection portion) 32, partition projection (projection portion) 33) formed on the bottom of the functional component-side attaching portion 30 are fitted with the raised and recessed portions (two semicircular projection portions 5 and 6, an annular recessed portion 7, the partitioning recessed portion 8) formed on the inner bottom portion of the attaching portion 2. Thus, the functional component 29 is fitted to the recessed portion 2A of the functional component mounting base 1 in the fitted state.

For example, as shown in FIG. 1, the functional component mounting base 1 is positioned on the inner surface 70 of the tire 60 so as to align the central axis 2X of the attaching portion 2 and an equator plane 60X of the tire 60, and as shown in FIG. 2, the bottom surface 4 and the inner surface 70 of the tire 60 are adhered by an adhesive or the like so as to arrange two semicircular projection portions 5 and 6 along the peripheral direction of the tire 60. Thus, the functional component mounting base 1 is fitted to the inner surface 70 of the tire 60.

After an assembly with the functional component 29 fitted to the functional component mounting base 1 is configured, the bottom surface 4 of the functional component mounting base 1 in the assembly and the inner surface 70 of the tire 60 are mutually adhered by an adhesive or the like. Otherwise, after the bottom surface 4 of the functional component mounting base 1 and the inner surface 70 of the tire 60 are adhered by an adhesive or the like, the functional component 29 is fitted to the recessed portion 2A of the functional component mounting base 1 which is fitted to the inner surface 70 of the tire 60. Thus, the functional component 29 is fitted to the inner surface 70 of the tire 60 via the functional component mounting base 1.

According to the structure that the functional component 29 is fitted to the inner surface 70 of the tire 60 via the functional component mounting base 1 and the functional component-side attaching portion 30 according to Embodiment 1, the recessed and raised portions formed on the bottom of the functional component-side attaching portion 30 and the raised and recessed portions formed on the inner bottom portion of the recessed portion 2A are mutually fitted by their concavo-convex fitting. Therefore, while the vehicle is travelling, the load (inertial force) applied to the functional component 29 is also supported by the semicircular projection portions 5 and 6 of the inner bottom portion of the recessed portion 2A during the stepping-in when a part of the peripheral surface of the tire 60 shifts from the non-ground contact part to the ground contact part and during the kicking out when a part of the peripheral surface of the tire shifts from the ground contact part to the non-ground contact part. Thus, load concentration on the wall portion which is opposite to the load direction can be moderated in the functional component attaching member 1, and durability of the functional component mounting base 1 becomes high.

That is, the functional component mounting base 1 according to the embodiment is attached to the inner surface 70 of the tire 60 along the peripheral direction of the tire 60 to arrange the plurality of projection portions (the semicircular projection portion 5 and the semicircular projection portion 6) with the recessed portion between them, so that the load (inertial force) generated when the tire 60 rotates can be dispersedly supported at a plurality of points, load concentration on the wall portion opposite to the load direction can be moderated, and durability of the functional component mounting base 1 is enhanced. The number of projection portions which are arranged with the recessed portion between them along the peripheral direction of the tire 60 may be several, for example, five or less.

Since the functional component-side attaching portion 30 and the rubber-made functional component mounting base 1 are not adhered mutually, when the tire 60 passes over a bump and an impact force is applied to the functional component mounting base 1, distortion of the functional component mounting base 1 can be prevented by elastic deformation of the functional component mounting base 1 and slippage on the contact interface between the functional component-side attaching portion 30 and the functional component mounting base 1. Thus, the functional component mounting base 1 has high durability against the impact force applied to the functional component mounting base 1 when the tire 60 passes over the bump.

And, the functional component mounting base 1 of Embodiment 1 is configured to have the inner wall surface 9 of the recessed portion 2A formed on the arc surface corresponding to the side surface formed on the arc surface 31 of the functional component-side attaching portion 30 to contact the inner wall surface 9 of the recessed portion 2A and the side portion of the functional component-side attaching portion 30 in the fitted state, so that the contact interface of the functional component-side attaching portion 30 and the functional component mounting base 1 becomes an arced curved surface. Therefore, the slippage of the contact interface is smooth and distortion concentration on the functional component mounting base 1 does not occur easily. Thus, durability of the functional component mounting base 1 is further improved.

The functional component-side attaching portion 30 of Embodiment 1 has the wall surface of the semicircular projection portion 5 and the wall surface of the semicircular projection portion 6 of the functional component mounting base 1, which are in contact with the wall surfaces of the partition projection 33 of the functional component-side attaching portion 30, formed of a plane surface extending along the radial direction of the tire 60. Therefore, a force for dispersedly supporting the load (inertial force) is increased and the inertial force can be supported by a plane surface with a small area. Thus, a height of the projection portion can be reduced, a depth of the recessed portion 2A can be reduced, and the functional component-side attaching portion 30 can be made smaller.

Since the inner bottom portion of the recessed portion 2A of the functional component mounting base 1 is configured to have an area of the projection portion larger than the area of the recessed portion, so that thick portions of the rubber between the bottom surface 4 of the functional component mounting base 1 and the top surface of the projection portion can be increased to be larger than thin portions of the rubber between the bottom surface 4 of the functional component mounting base 1 and the inner bottom surface of the recessed portion. Thus, the functional component mounting base 1 can be configured to have high durability.

Thus, according to the functional component mounting base 1 of the embodiment, it is configured to mutually fit the recessed and raised portions formed on the bottom of the functional component-side attaching portion 30 and the raised and recessed portions formed on the inner bottom portion of the recessed portion 2A by concavo-convex fitting, so that the load (inertial force) applied to the functional component 29 can be dispersedly supported during the stepping-in and the kicking out of the tire 60, and when the tire 60 passes over a bump and an impact force is applied to the functional component mounting base 1, the impact force can be released by the slippage on the contact interface between the functional component-side attaching portion 30 and the functional component mounting base 1. Thus, there can be obtained the functional component mounting base 1 with high durability against the load applied to the functional component 29 during the stepping-in and the kicking out of the tire 60 and the impact force applied to the functional component mounting base 1 while passing over the bump.

Figure 7:
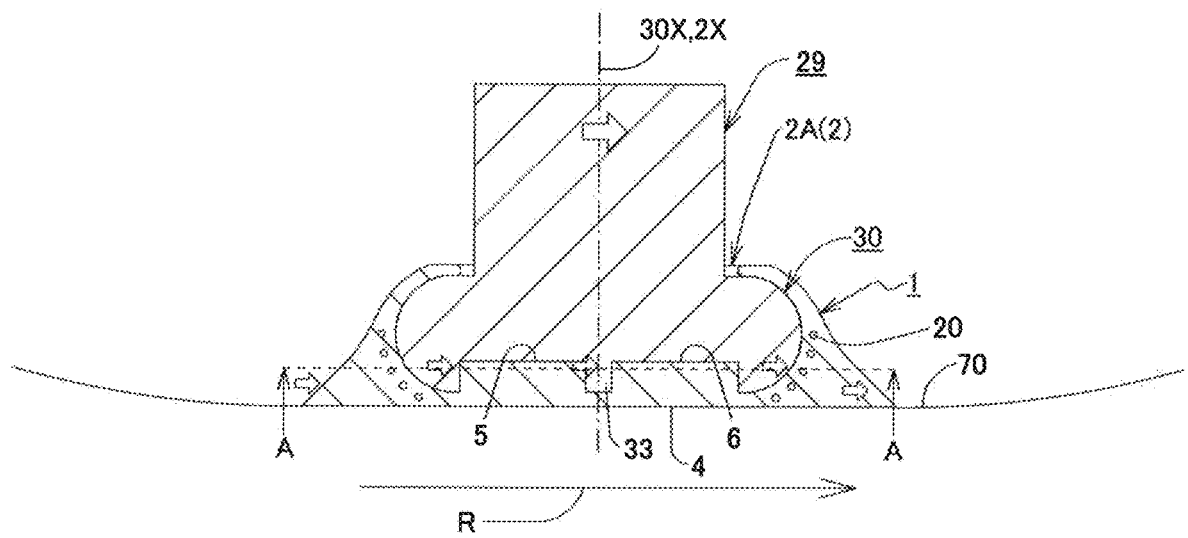
FIG. 7 is a sectional view showing a load distribution applied to the functional component while the vehicle is travelling (Embodiment 1).

Furthermore, the functional component mounting base 1 of Embodiment 1 has a structure that the reinforcing material 20 is arranged along the inner wall surface 9 of the recessed portion 2A and embedded in the rubber portion on the outer side of the inner wall surface 9 of the recessed portion 2A so as to surround the periphery of the inner wall surface 9 of the recessed portion 2A. Therefore, when the tire 60, in which the functional component 29 is attached to the inner surface 70 via the functional component mounting base 1, rotates and the vehicle is travelling, the reinforcing material 20 is pulled in a load direction if a load (inertial force) indicated by white arrow is applied to the functional component 29 as shown in FIG. 7, so that as shown in FIG. 8, the load can be distributed to the whole outer circumferential wall portion of the functional component mounting base 1, and durability of the functional component mounting base 1 can be further improved.

Figure 8:
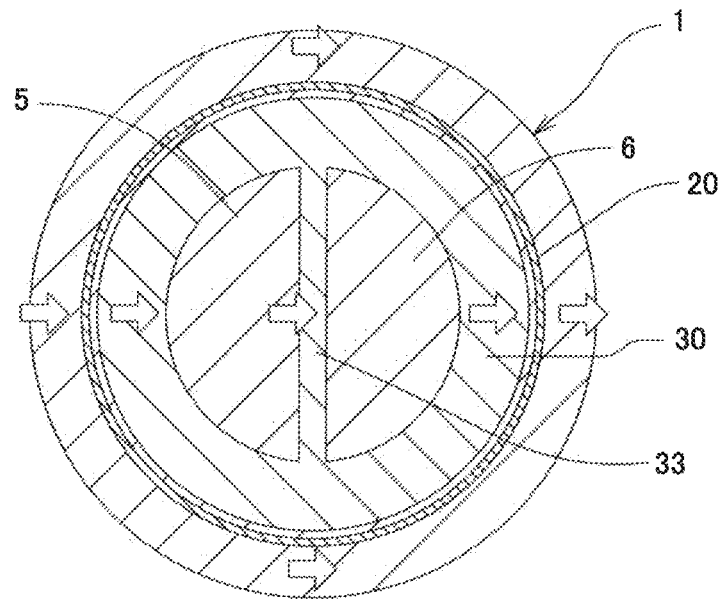
FIG. 8 is a sectional view showing a load distribution in A-A cross section of FIG. 7 (Embodiment 1).

That is, as shown in FIG. 8, when the load (inertial force) is applied as indicated by white arrows to the functional component 29 while the vehicle is travelling, the wall portion which is opposite to the load direction is pushed to the load direction by the functional component-side attaching portion 30 and the reinforcing material 20 is also pushed in the load direction, and the load is distributed to the whole of the outer circumferential wall portion of the functional component mounting base 1 through the reinforcing material 20. Therefore, in comparison with the structure that the load is concentrated on the wall portion which is opposite to the load direction as a conventional functional component mounting base shown in FIG. 20 and FIG. 21, the load can be distributed to the whole of the outer circumferential wall portion, so that the stress concentration on a particular point of the wall portion of the functional component mounting base 1 is reduced, and the functional component mounting base 1 has durability improved. That is, when the load (inertial force) is applied to the functional component 29 while the vehicle is travelling, the load can also be borne by portions other than the wall portion which is opposite to the load direction, and durability of the functional component mounting base 1 can be further improved.

The functional component mounting base 1 (the functional component mounting base 1 which is configured by embedding the annular ring body as the plurality of reinforcing material 20 into the rubber portion on the outer side of the inner wall surface 9 of the recessed portion 2A so as to surround the periphery of the inner wall surface 9 of the recessed portion 2A of the functional component mounting base 1) with the reinforcing material 20 according to Embodiment 1 embedded is fitted to the inner surface of the tire, and the functional component 29 is fitted to the functional component mounting base 1. The tire in which an air pressure is set to three atmosphere pressures is rotated to apply an inertial force of 100N to the functional component 29, and the calculation results of the shear stress distribution applied to the bottom surface (the surface adhered to the tire) 4 of the functional component mounting base 1 are shown in FIG. 9.

Figure 10:
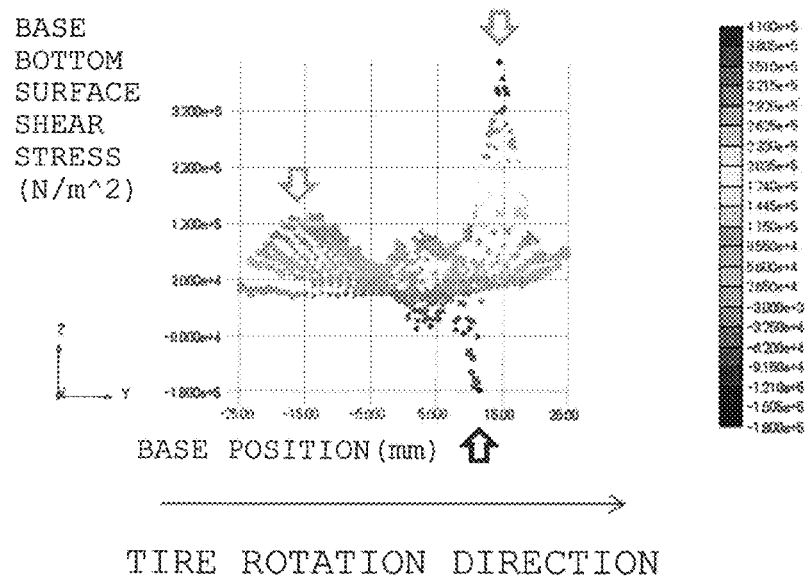
FIG. 10 is a diagram showing calculation result of a shear stress distribution applied to a functional component mounting base (prior art).
Figure 20:
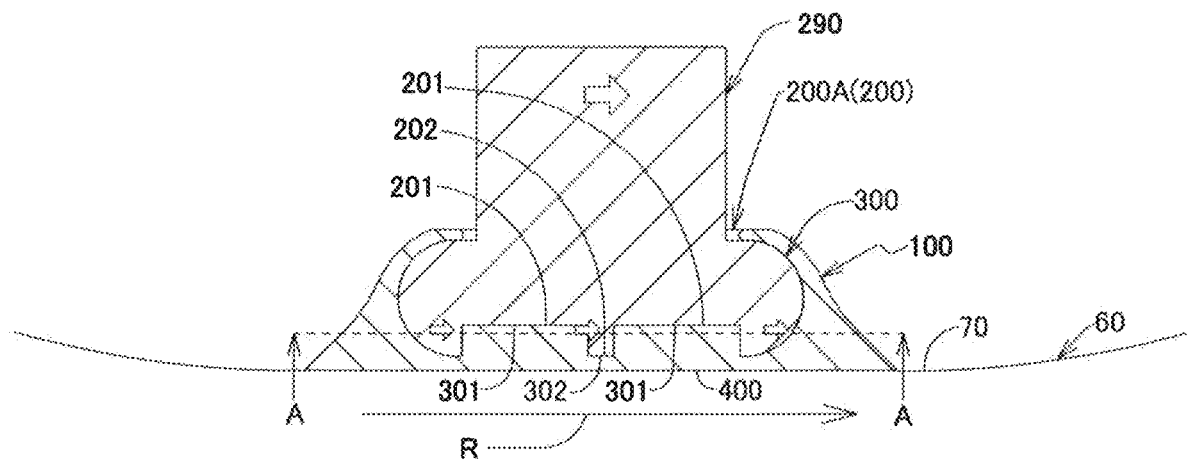
FIG. 20 is a sectional view showing a load distribution applied to a functional component while a vehicle is travelling (prior art).
Figure 21:
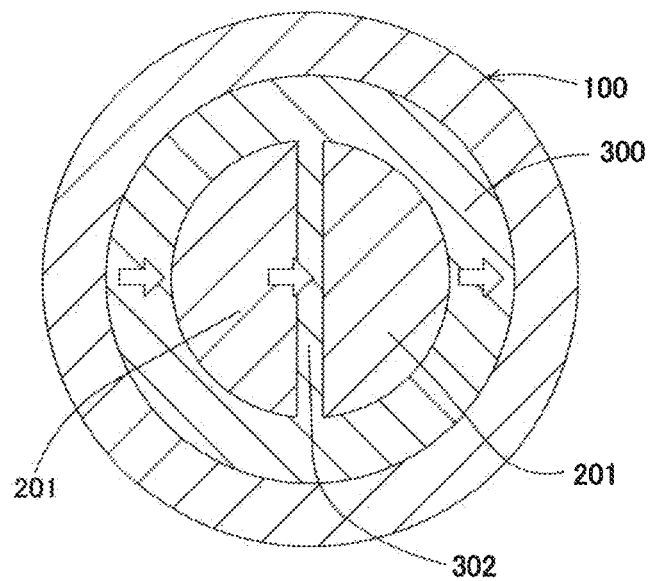
FIG. 21 is a sectional view showing a load distribution in A-A cross section of FIG. 20 (prior art).

And, a conventional functional component mounting base 100 (the functional component mounting base with the reinforcing material not embedded) shown in FIG. 20 and FIG. 21 is attached to the inner surface of the tire, the tire in which an air pressure is set to three atmosphere pressures is rotated to apply an inertial force of 100N to a functional component 290, and the calculation results of the shear stress distribution applied to the bottom surface (the surface adhered to the tire) 400 of the functional component mounting base 100 are shown in FIG. 10.

Figure 9:
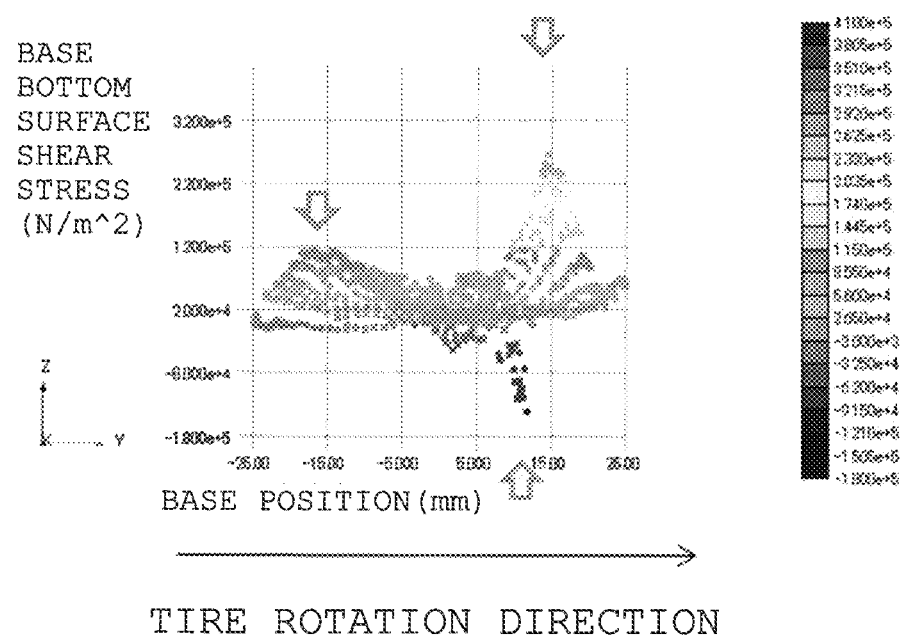
FIG. 9 is a diagram showing calculation results of a shear stress distribution applied to the functional component mounting base (Embodiment 1).

It is apparent from FIG. 9 and FIG. 10 that the shear stress distribution applied to the conventional functional component mounting base 100 shown in FIG. 20 and FIG. 21 has an increase in stress (portions indicated by arrows in FIG. 10) to the front and rear wall portions (wall portions opposite to the load direction) in the rotation (rolling) direction of the tire. But, according to the functional component mounting base 1 of Embodiment 1, the load (inertial force) is distributed by the reinforcing material 20 to the whole of the outer circumferential wall portion of the functional component mounting base 1, so that the shear stress distribution applied to the functional component mounting base 1 was found that the stress (a portion indicated by the arrows in FIG. 9) to the front and rear wall portions (wall portions opposite to the load direction) in the rotation (rolling) direction of the tire becomes small. That is, the functional component mounting base 1 of Embodiment 1 was found that in comparison with the conventional functional component mounting base 100, the stress concentration on the front and rear wall portions (wall portions opposite to the load direction) in the rotation (rolling) direction of the tire can be moderated, and durability of the functional component mounting base 1 is improved. In other words, it was found that the functional component mounting base 1 of Embodiment 1 can have high-speed durability indicating that durability can be secured even at a higher speed.

Embodiment 2

Figure 11:
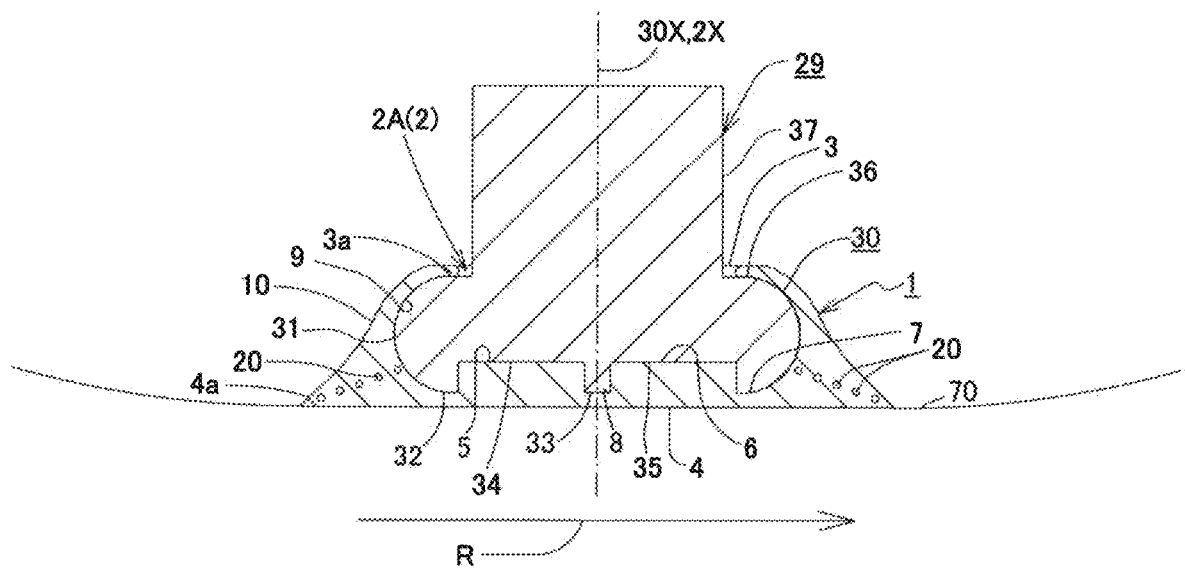
FIG. 11 is a sectional view showing a functional component mounting base attached to an inner surface of a tire and a functional component attached to the functional component mounting base (Embodiment 2).

The functional component mounting base 1 of Embodiment 2 is configured as shown in FIG. 11 where a plurality of annular bodies or at least one spiral body is embedded as the reinforcing material 20 in the rubber portion on the outer side of the inner wall surface 9 of the recessed portion 2A so as to surround the periphery of the inner wall surface (inner peripheral surface) 9 of the recessed portion 2A, and the reinforcing material 20 is arranged to incline and extend from the recessed portion 2A side toward the outer circumferential edge 4s side of the bottom surface 4.

Figure 12:
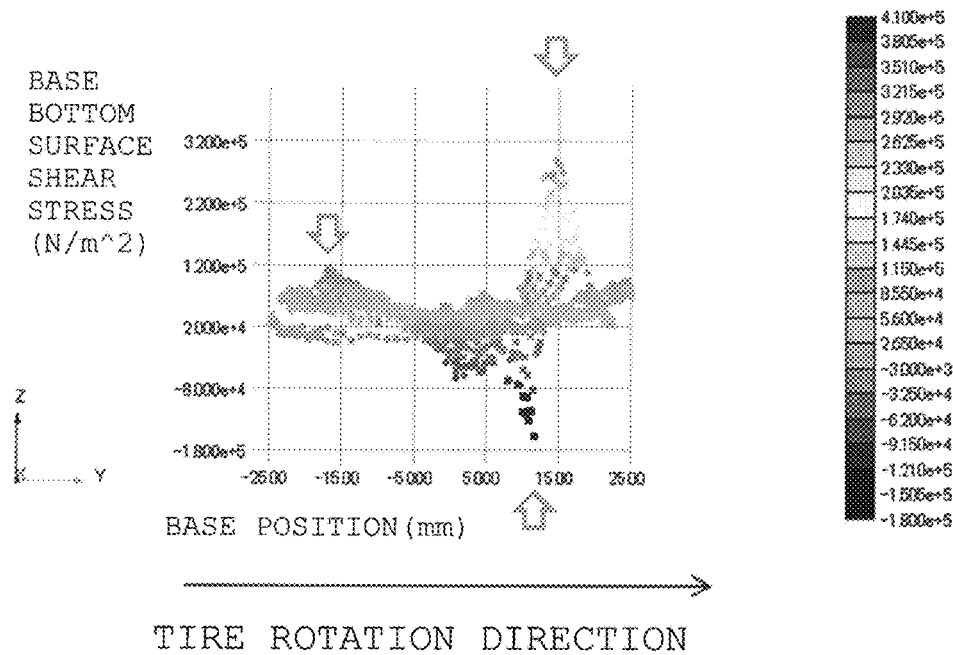
FIG. 12 is a diagram showing calculation result of a shear stress distribution applied to the functional component mounting base (Embodiment 2).

The functional component mounting base 1 in which the reinforcing material 20 is embedded according to Embodiment 2 is fitted to the inner surface of the tire, the functional component 29 is fitted to the functional component mounting base 1, the tire in which an air pressure is set to three atmosphere pressures is rotated to apply an inertial force of 100N to the functional component 29, and the calculation results of the shear stress distribution applied to the bottom surface (the surface adhered to the tire) 4 of the functional component mounting base 1 are shown in FIG. 12.

It is apparent from FIG. 12 that similar to the functional component mounting base 1 of Embodiment 1, the load is distributed by the reinforcing material 20 to the whole of the outer circumferential wall portion of the functional component mounting base 1 of Embodiment 2, so that the shear stress distribution applied to the functional component mounting base 1 has the stress (portions indicated by arrows in FIG. 12) to the wall portion opposite to the load direction decreased, and it was found that the stress concentration on the wall portion opposite to the load direction can be moderated in comparison with the conventional functional component mounting base 100, and durability of the functional component mounting base 1 is improved.

Embodiment 3

Figure 13:
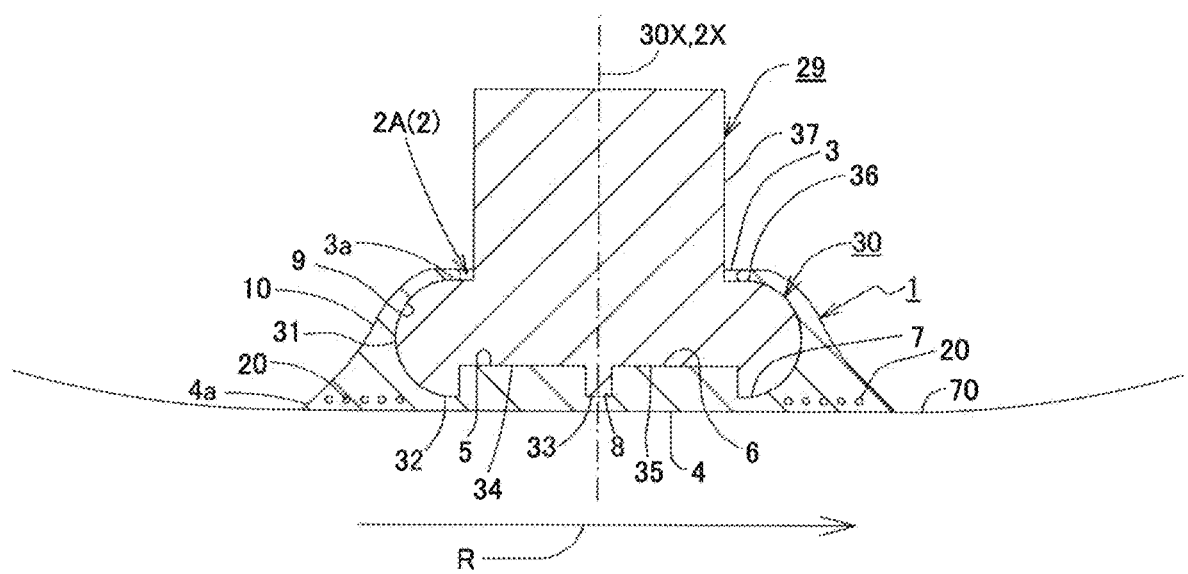
FIG. 13 is a sectional view showing a functional component mounting base attached to inner surface of a tire and a functional component attached to the functional component mounting base (Embodiment 3).

The functional component mounting base 1 of Embodiment 3 is configured that as shown in FIG. 13, a plurality of annular bodies or at least one spiral body is embedded as the reinforcing material 20 in the rubber portion on the outer side of the inner wall surface 9 of the recessed portion 2A so as to surround the periphery of the inner wall surface (inner peripheral surface) 9 of the recessed portion 2A, and the reinforcing material 20 is arranged to extend along the bottom surface 4 of the functional component mounting base 1.

Figure 14:
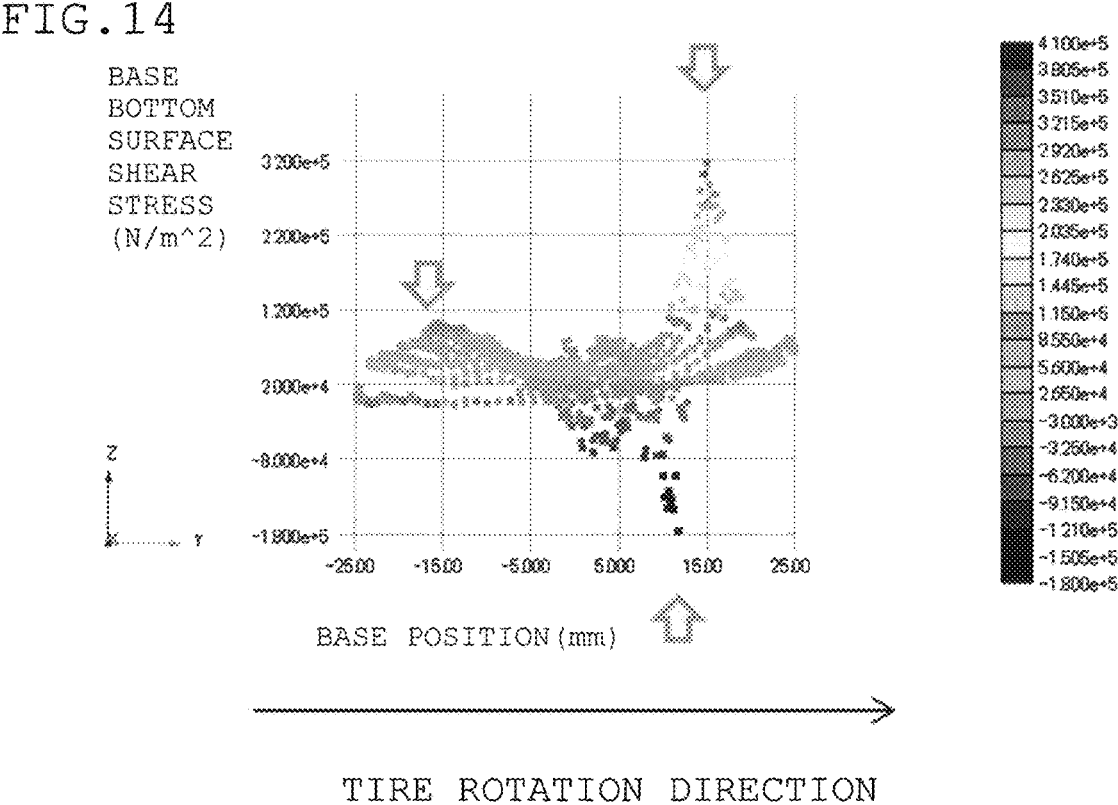
FIG. 14 is a diagram showing calculation result of a shear stress distribution applied to the functional component mounting base (Embodiment 3).

The functional component mounting base 1 in which the reinforcing material 20 according to Embodiment 3 is embedded is fitted to the inner surface of the tire, the tire in which an air pressure is set to three atmosphere pressures is rotated to apply an inertial force of 100N to the functional component 29, and the calculation results of the shear stress distribution applied to the bottom surface (the surface adhered to the tire) 4 of the functional component mounting base 1 are shown in FIG. 14.

It is apparent from FIG. 14, similar to the functional component mounting base 1 of Embodiment 1, the load is distributed by the reinforcing material 20 to the whole of the outer circumferential wall portion of the functional component mounting base 1 in the case of the functional component mounting base 1 of Embodiment 3, so that the shear stress distribution applied to the functional component mounting base 1 has the stress (portions indicated by arrows in FIG. 14) to the wall portion opposite to the load direction decreased, the stress concentration on the wall portion opposite to the load direction can be moderated in comparison with the conventional functional component mounting base 100, and it was found that durability of the functional component mounting base 1 is improved.

Embodiment 4

Figure 15:
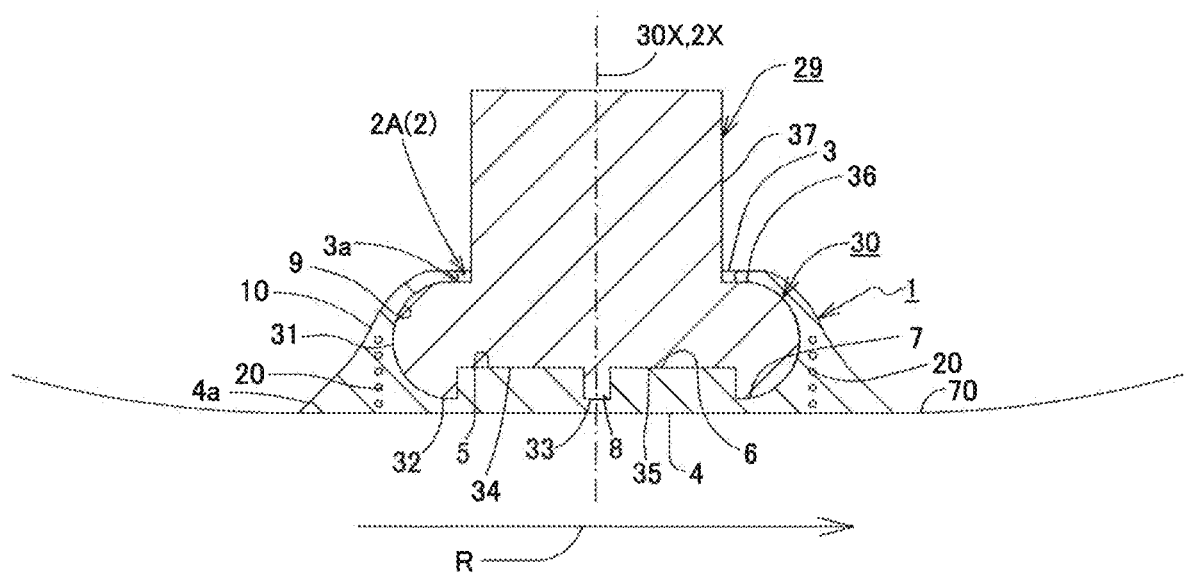
FIG. 15 is a sectional view showing a functional component mounting base attached to an inner surface of a tire and a functional component attached to the functional component mounting base (Embodiment 4).

The functional component mounting base 1 of Embodiment 4 is configured as shown in FIG. 15 where a plurality of annular bodies or at least one spiral body is embedded as the reinforcing material 20 in the rubber portion on the outer side of the inner wall surface 9 of the recessed portion 2A to surround the periphery of the inner wall surface (inner peripheral surface) 9 of the recessed portion 2A, and the reinforcing material 20 is arranged to extend along a direction orthogonal to a plane surface forming the bottom surface 4 of the functional component mounting base 1. In other words, the reinforcing material 20 is arranged to extent along the central axis 2X of the recessed portion 2A. Further in other words, the reinforcing material 20 is arranged to extend along the direction orthogonal to the radial direction of the recessed portion 2A of the functional component mounting base 1.

Figure 16:
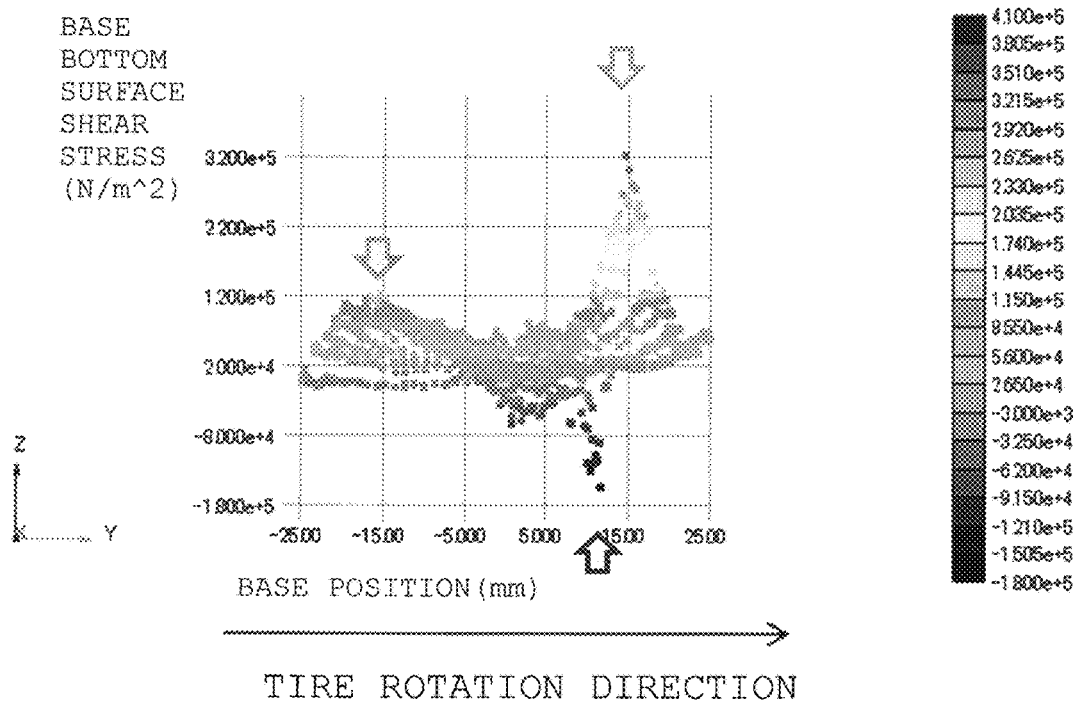
FIG. 16 is a diagram showing calculation result of a shear stress distribution applied to the functional component mounting base (Embodiment 4).

The functional component mounting base 1 in which the reinforcing material 20 according to Embodiment 4 is embedded is fitted to the inner surface of the tire, the functional component 29 is fitted to the functional component mounting base 1, the tire in which an air pressure is set to three atmosphere pressures is rotated to apply an inertial force of 100N to the functional component 29, and calculation results of the shear stress distribution applied to the bottom surface (the surface adhered to the tire) 4 of the functional component mounting base 1 are shown in FIG. 16.

It is apparent from FIG. 16, similar to the functional component mounting base 1 of Embodiment 1, in the case of the functional component mounting base 1 of Embodiment 4, the load is distributed by the reinforcing material 20 to the whole of the outer circumferential wall portion of the functional component mounting base 1, so that the shear stress distribution applied to the functional component mounting base 1 has the stress (portions indicated by arrows in FIG. 16) to the wall portion opposite to the load direction decreased, and in comparison with the conventional functional component mounting base 100, it was found that the stress concentration on the wall portion opposite to the load direction can be moderated, and durability of the functional component mounting base 1 is improved.

Embodiment 5

Figure 17:
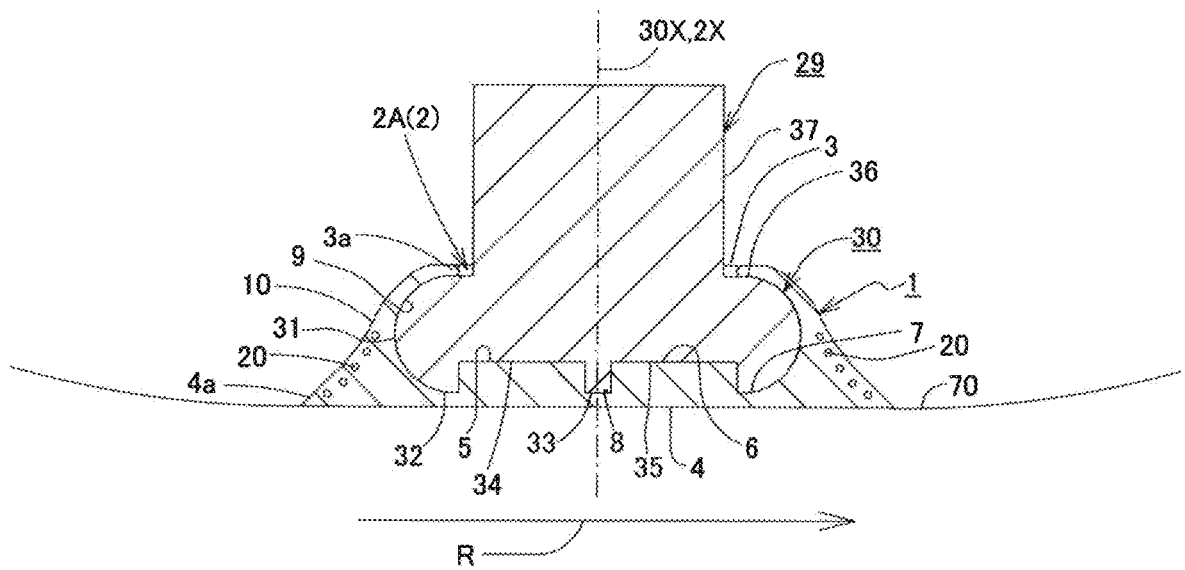
FIG. 17 is a sectional view showing a functional component mounting base attached to an inner surface of a tire and a functional component attached to the functional component mounting base (Embodiment 5).

The functional component mounting base 1 of Embodiment 5 is configured as shown in FIG. 17 where a plurality of annular bodies or at least one spiral body is embedded as the reinforcing material 20 in the rubber portion on the outer side of the inner wall surface 9 of the recessed portion 2A to surround the periphery of the inner wall surface (inner peripheral surface) 9 of the recessed portion 2A, and the reinforcing material 20 is arranged to extend along the outer wall surface 10 of the functional component mounting base 1.

Figure 18:
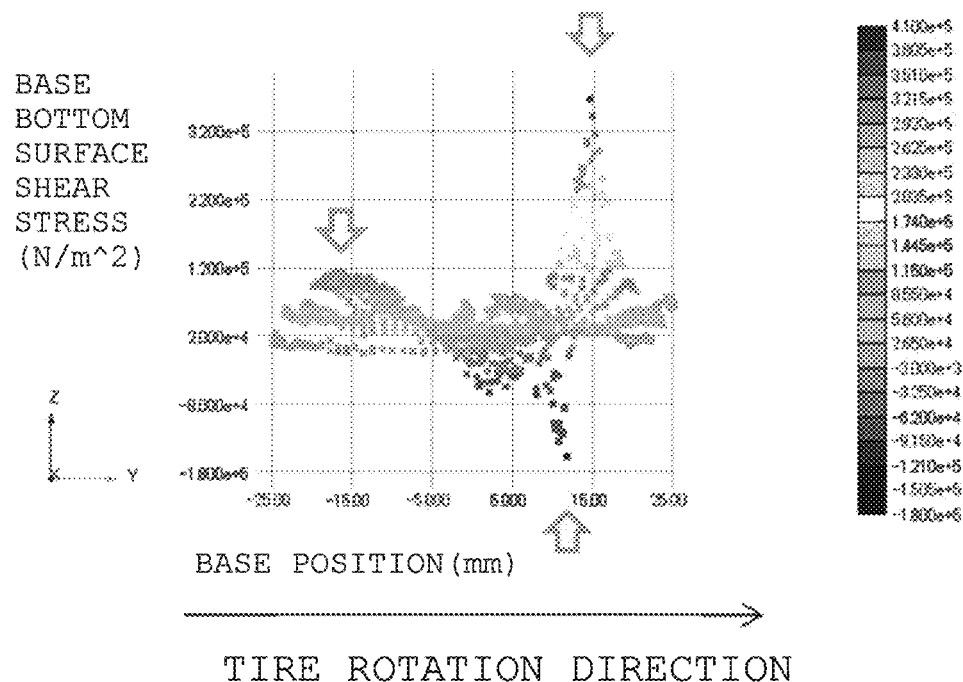
FIG. 18 is a diagram showing calculation result of a shear stress distribution applied to the functional component mounting base (Embodiment 5).
Figure 19:
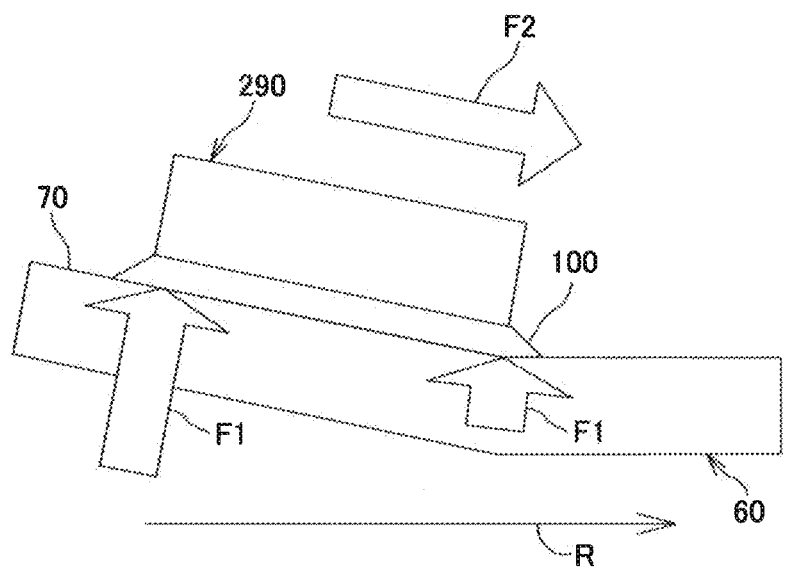
FIG. 19 is an explanatory view showing a state that a load (inertial force) is applied to a functional component attached to an inner surface of a tire via a functional component mounting base.

The functional component mounting base 1 in which the reinforcing material 20 according to Embodiment 5 is embedded is fitted to the inner surface of the tire, the functional component 29 is fitted to the functional component mounting base 1, the tire in which an air pressure is set to three atmosphere pressures is rotated to apply an inertial force of 100N to the functional component 29, and calculation results of the shear stress distribution applied to the bottom surface (the surface adhered to the tire) 4 of the functional component mounting base 1 are shown in FIG. 18.

It is apparent from FIG. 18, similar to the functional component mounting base 1 of Embodiment 1, the load is distributed by the reinforcing material 20 to the whole of the outer circumferential wall portion of the functional component mounting base 1 in the case of the functional component mounting base 1 of Embodiment 5, so that the shear stress distribution applied to the functional component mounting base 1 has the stress (portion indicated by arrows in FIG. 18) to the wall portion opposite to the load direction decreased, and it was found that the stress concentration on the wall portion opposite to the load direction can be moderated in comparison with the conventional functional component mounting base 100, and durability of the functional component mounting base 1 is improved.

Among the functional component mounting bases 1 of Embodiment 1 through Embodiment 5, it is found that the functional component mounting base 1 of Embodiment 1 is the best to provide a mitigating effect on the stress concentration on the front and rear wall portion (wall portion opposite to the load direction) in the tire rotation (rolling) direction. The second best is the functional component mounting base 1 of Embodiment 2, the third best is the functional component mounting base 1 of Embodiment 3, the fourth best is the functional component mounting base 1 of Embodiment 4, and the fifth best is the functional component mounting base 1 of Embodiment 5.

It is seen from the above tendency that when the whole of the reinforcing material 20 is arranged at a position closer to the inner wall surface 9 of the recessed portion 2A to reinforce the inner wall surface 9 similar to the functional component mounting base 1 of Embodiment 1, the effect to moderate the stress concentration on the wall portion opposite to the load direction is most notable, and when the reinforcing material 20 is arranged to slant and extend from the recessed portion 2A side toward the outer circumferential edge 4s side of the bottom surface 4 similar to the functional component mounting base 1 of Embodiment 2 and when the reinforcing material 20 is configured to support the inner wall surface 9 of the recessed portion 2A along the radial direction of the functional component mounting base 1, the effect to moderate the stress concentration on the wall portion opposite to the load direction is high.

On the other hand, it was found that when the reinforcing material 20 is arranged away from the inner wall surface 9 of the recessed portion 2A and not configured to support the inner wall surface 9 along the radial direction of the functional component mounting base 1 similar to the functional component mounting bases 1 of Embodiments 3 through 5, the effect to moderate the stress concentration on the wall portion opposite to the load direction is inferior to the functional component mounting bases 1 of Embodiment 1 and Embodiment 2.

As described above, according to the functional component mounting bases 1 of Embodiments 1 through 5, when the load is applied to the functional component while the vehicle is travelling, the load is distributed by the reinforcing material 20 to the whole of the outer circumferential wall portion of the functional component mounting base 1, so that the stress concentration on the wall portion opposite to the load direction is reduced, and the functional component mounting base 1 has higher durability.

The functional component mounting base 1 may have a structure combining the reinforcing materials 20 according to any two or more of the above-described Embodiments 1 through Embodiment 5.

The reinforcing material 20 may be configured to be embedded in the rubber portion on the outer side of the inner wall surface 9 of the recessed portion 2A to surround the periphery of the inner wall surface (inner peripheral surface)

9 of the recessed portion 2A of the functional component mounting base 1 by spirally entangling a plurality of linear materials.

And, the functional component mounting base 1 may have a structure that the reinforcing material 20 is arranged at least at a position corresponding to the tire peripheral direction of the functional component mounting base 1 fixed to the inner surface 70 of the tire 60. For example, the reinforcing material 20 may be provided to extend in the peripheral direction of the inner wall surface 9 along the outer side of the inner wall surface 9 of the recessed portion 2A at a position corresponding to the tire peripheral direction of the functional component mounting base 1. In this case, when the load is applied to the functional component 29 while the vehicle is travelling, the load can also be borne by portions other than the wall portion opposite to the load direction, and the functional component mounting base (functional component attaching member) 1 with durability further improved can be configured.

The functional component mounting base 1 of the present invention may be fitted to any portion of the inner surface 70 of the tire 60 if the load can also be borne by the portions other than the wall portion opposite to the load direction if the load (inertial force) is applied to the functional component 29 while the vehicle is travelling.

The functional component 29 is configured to have independently various sensors for detecting a tire air pressure, a temperature, acceleration, etc., a battery or a power generation element, a radio, a heating element, a pump, and other electronic parts and devices or configured to have two or more of the above electronic parts and devices, and may have the functional component-side attaching portion 30 formed of resin and the protrusion part 37 formed to protrude from the functional component-side attaching portion 30.

The functional component-side attaching portion 30 may be formed into the shape such as a rotating body, a columnar body, or a platen body which has a side face formed to have a diameter size larger than a diameter size between both ends (bottom and top portions) in a direction along the central axis 30X, for example, the shape such as a spheroid body, a cylindrical body or a disk body which is obtained with the short axis of an ellipse as a rotation axis (the central axis).

The described structure mechanically fits the raised and recessed portions provided on the inner bottom portion of the recessed portion 2A of the functional component mounting base 1 and the recessed and raised portions provided on the bottom of the functional component-side attaching portion 30 mutually but may also be configured by forming the inner bottom surface of the recessed portion 2A of the functional component mounting base 1 and the bottom surface of the functional component-side attaching portion 30 mutually on the flat surface.

The functional component attaching member according to the present invention is a functional component attaching member which is formed of rubber for attaching a functional component to an inner surface of a tire, comprising a bottom surface to be fixed to the inner surface of the tire; an attaching portion having a recessed portion in which a functional component-side attaching portion provided to the functional component is fitted in a fitted state; and a reinforcing material embedded in a rubber portion on an outer side of the recessed portion, so that when a load is applied to the functional component while a vehicle is travelling, the load can also be borne by portions other than the wall portion opposite to the load direction, and durability of the functional component attaching member can be further improved.

The reinforcing material is formed of one or more annular bodies arranged in the rubber to surround a periphery of the recessed portion, so that when the load is applied to the functional component, the reinforcing material is pulled in the load direction, and the load can be distributed to the whole of the outer circumferential wall portion of the functional component attaching member, so that durability of the functional component attaching member can be further improved.

The reinforcing material is formed of one or more spiral bodies arranged in the rubber to surround a periphery of the recessed portion, so that when the load is applied to the functional component, the reinforcing material is pulled in the load direction, and the load can be distributed to the whole of the outer circumferential wall portion of the functional component attaching member, so that durability of the functional component attaching member can be further improved.

The reinforcing material is arranged at a position corresponding to a tire peripheral direction of the functional component attaching member fixed to the inner surface of the tire, so that when the load is applied to the functional component while the vehicle is travelling, the load can also be borne by portions other than the wall portion opposite to the load direction, and durability of the functional component attaching member can be further improved.

The reinforcing material is arranged to extend along an inner wall surface of the recessed portion, so that the whole of the reinforcing material is arranged at a position close to the inner wall surface of the recessed portion to reinforce the inner wall surface, and the effect to distribute the load to the whole of the outer circumferential wall portion of the functional component attaching member is enhanced, so that durability of the functional component attaching member can be further improved.

The reinforcing material is arranged to incline and extend from the recessed portion side to an outer circumferential edge side of the bottom surface, so that the reinforcing material is configured to support the inner wall surface of the recessed portion along the radial direction of the functional component attaching member, the effect to distribute the load to the whole of the outer circumferential wall portion of the functional component attaching member is enhanced, and durability of the functional component attaching member can be further improved.

The reinforcing material is arranged to extend along the bottom surface, so that the load can be distributed to the whole of the outer circumferential wall portion of the functional component attaching member, and durability of the functional component attaching member can be further improved.

The reinforcing material is arranged to extend along a direction orthogonal to the bottom surface, so that the load can be distributed to the whole of the outer circumferential wall portion of the functional component attaching member, so that durability of the functional component attaching member can be further improved.

The reinforcing material is arranged to extend along the outer wall surface of the functional component attaching member, so that the load can be distributed to the whole of the outer circumferential wall portion of the functional component attaching member, and durability of the functional component attaching member can be further improved.

The recessed portion is formed to have an opening as an inlet/outlet for inserting/removing the functional component-side attaching portion formed to have a diameter smaller than a maximum diameter of the functional component-side attaching portion and a maximum diameter of the recessed portion corresponding to the maximum diameter of the functional component-side attaching portion; the functional component-side attaching portion is fitted to the recessed portion in a fitted state by expanding the diameter of the opening to insert into the recessed portion; and the reinforcing material is arranged at a position closer to the bottom surface side than a position of the maximum diameter of the recessed portion provided between the opening of the recessed portion and an inner bottom portion of the recessed portion, so that the opening edge side of the opening is not reinforced by the reinforcing material and expanded in a direction to separate from the central axis to easily expand the diameter so that the diameter size of the opening has a size larger than the maximum diameter of the functional component-side attaching portion, and the functional component-side attaching portion is easily fitted to the recessed portion.

The reinforcing material is a steel cord or an organic fiber, so that the load can be distributed to the whole of the outer circumferential wall portion of the functional component attaching member, and durability of the functional component attaching member can be further improved.

An inner bottom portion of the recessed portion is provided with raised and recessed portions which are mutually fitted with recessed and raised portions provided on a bottom of the functional component-side attaching portion, so that the load applied to the functional component is also supported by the projection portion of the inner bottom portion of the recessed portion, load concentration on the wall portion opposite to the load direction can be moderated by the functional component attaching member, and the functional component attaching member is provided with high durability.

DESCRIPTION OF REFERENCE NUMERALS 1 functional component mounting base (functional component mounting base)
2 attaching portion
2A recessed portion
3 opening
3A opening diameter
4 bottom surface
4a outer circumferential edge of bottom surface
5, 6 semicircular projection portion (projection portion)
8 partitioning recessed portion (recessed portion)
9 inner wall surface of recessed portion
10 outer wall surface
20 reinforcing material
29 functional component
30 functional component-side attaching portion
30A maximum diameter of functional component-side attaching portion
34, 35 semicircular recessed portion (recessed portion)
33 partition projection (projection portion)
60 tire
70 inner surface of tire

The invention claimed is:

1. A functional component attaching member which is formed of rubber for attaching a functional component to an inner surface of a tire, comprising:
a bottom surface to be fixed to the inner surface of the tire;
an attaching portion having a recessed portion in which a functional component-side attaching portion provided on the functional component is fitted in a fitted state; and
a reinforcing material embedded in a rubber portion on an outer side of the recessed portion,
wherein the reinforcing material is formed of a plurality of ring-shaped bodies arranged in the rubber to surround a periphery of the recessed portion;
wherein an inner bottom portion of the recessed portion is provided with semi-circular raised portions which are mutually fitted with semi-circular raised portions provided on a bottom of the functional component-side attaching portion.

2. The functional component attaching member according to claim 1, wherein a diameter of the plurality of ring-shaped bodies changes along a radial direction of the tire.

3. A functional component attaching member which is formed of rubber for attaching a functional component to an inner surface of a tire, comprising:
a bottom surface to be fixed to the inner surface of the tire;
an attaching portion having a recessed portion in which a functional component-side attaching portion provided on the functional component is fitted in a fitted state; and
a reinforcing material embedded in a rubber portion on an outer side of the recessed portion,
wherein the reinforcing material is formed of one or more spiral bodies arranged in the rubber to surround a periphery of the recessed portion, a diameter of the one or more spiral bodies changing along a radial direction of the tire.

4. The functional component attaching member according to claim 1, wherein the reinforcing material is arranged at a position corresponding to a tire peripheral direction of the functional component attaching member fixed to the inner surface of the tire.

5. The functional component attaching member according to claim 1, wherein the reinforcing material is arranged to extend along an inner wall surface of the recessed portion.

6. The functional component attaching member according to claim 1, wherein the reinforcing material is arranged to incline and extend from the recessed portion side to an outer circumferential edge side of the bottom surface.

7. The functional component attaching member according to claim 1, wherein the reinforcing material is arranged to extend along the bottom surface.

8. The functional component attaching member according to claim 1, wherein the reinforcing material is arranged to extend along a direction orthogonal to the bottom surface.

9. The functional component attaching member according to claim 1 wherein the reinforcing material is arranged to extend along an outer wall surface of the functional component attaching member.

10. The functional component attaching member according to claim 1, wherein:
the recessed portion is formed to have an opening as an inlet/outlet for inserting/removing the functional component-side attaching portion formed to have a diameter smaller than a maximum diameter of the functional component-side attaching portion and a maximum diameter of the recessed portion corresponding to the maximum diameter of the functional component-side attaching portion;

the functional component-side attaching portion is fitted to the recessed portion in a fitted state by expanding the diameter of the opening to insert into the recessed portion; and the reinforcing material is arranged at a position closer to a bottom surface side than a position of the maximum diameter of the recessed portion provided between the opening of the recessed portion and an inner bottom portion of the recessed portion.

11. The functional component attaching member according to claim 1, wherein the reinforcing material is a steel cord or an organic fiber.

12. The functional component attaching member according to claim 3, wherein the reinforcing material is arranged at a position corresponding to a tire peripheral direction of the functional component attaching member fixed to the inner surface of the tire.

13. The functional component attaching member according to claim 3, wherein the reinforcing material is arranged to extend along an inner wall surface of the recessed portion.

14. The functional component attaching member according to claim 3, wherein:

the recessed portion is formed to have an opening as an inlet/outlet for inserting/removing the functional component-side attaching portion formed to have a diameter smaller than a maximum diameter of the functional component-side attaching portion and a maximum diameter of the recessed portion corresponding to the maximum diameter of the functional component-side attaching portion;

the functional component-side attaching portion is fitted to the recessed portion in a fitted state by expanding the diameter of the opening to insert into the recessed portion; and the reinforcing material is arranged at a position closer to a bottom surface side than a position of the maximum diameter of the recessed portion provided between the opening of the recessed portion and an inner bottom portion of the recessed portion.

15. The functional component attaching member according to claim 3, wherein the reinforcing material is a steel cord or an organic fiber.

16. The functional component attaching member according to claim 3, wherein an inner bottom portion of the recessed portion is provided with semi-circular raised portions which are mutually fitted with semi-circular raised portions provided on a bottom of the functional component-side attaching portion.

\* \* \* \* \*